United States Patent [19]

Lynch et al.

[11] Patent Number: 4,601,740
[45] Date of Patent: Jul. 22, 1986

[54] METHODS OF AND APPARATUS FOR AT LEAST PARTIALLY CLOSING AN END PORTION OF AN OPTICAL PREFORM TUBE

[75] Inventors: Brian Lynch, Norcross; William D. O'Brien, Jr., Lilburn, both of Ga.

[73] Assignee: AT&T Technologies, Inc., Berkeley Heights, N.J.

[21] Appl. No.: 682,975

[22] Filed: Dec. 18, 1984

[51] Int. Cl.$^4$ .......................................... C03B 37/025
[52] U.S. Cl. .......................................... 65/2; 65/3.12; 65/13; 65/109
[58] Field of Search ...................... 65/2, 3.12, 13, 109

[56] References Cited

U.S. PATENT DOCUMENTS

| | | |
|---|---|---|
| 1,436,825 | 11/1922 | Sanford . |
| 1,436,878 | 11/1922 | Heisey . |
| 2,335,617 | 11/1943 | Thomas et al. . |
| 2,359,501 | 10/1944 | White . |
| 3,025,638 | 3/1962 | Krawetzke et al. . |
| 4,154,591 | 5/1979 | French et al. ................... 65/2 |
| 4,231,777 | 11/1980 | Lynch et al. . |
| 4,276,243 | 6/1981 | Partus . |
| 4,477,273 | 10/1984 | Lynch et al. . |
| 4,486,214 | 12/1984 | Lynch et al. . |

FOREIGN PATENT DOCUMENTS 2849608  5/1979  Fed. Rep. of Germany ............ 65/2

Primary Examiner—Robert Lindsay
Attorney, Agent, or Firm—E. W. Somers

[57] ABSTRACT

A preform from which lightguide fiber is drawn is made by depositing optically suitable layers of doped silicon dioxide on an inner wall of a rotating glass tube (31) which is exposed to a moving zone of heat (56) which is provided by a torch assembly (50) during a deposition mode and during a collapse mode. After the deposition mode and generally prior to the collapse mode, one end portion of the tube is at least partially closed in order to allow pressurizing of the tube during collapse. This is accomplished with a pivotally mounted tool (70) which straddles the torch assembly to cause an internally water cooled contact device (92) to be disposed within the confines of the torch. Further, the contact device is configured to provide a curved lead-in from the tube to the at least partially closed portion. The use of separate apparatus for initially closing the tube provides control of the sealed-off portion and prevents an irregular cross-section from being propagated along the length of the tube.

12 Claims, 8 Drawing Figures

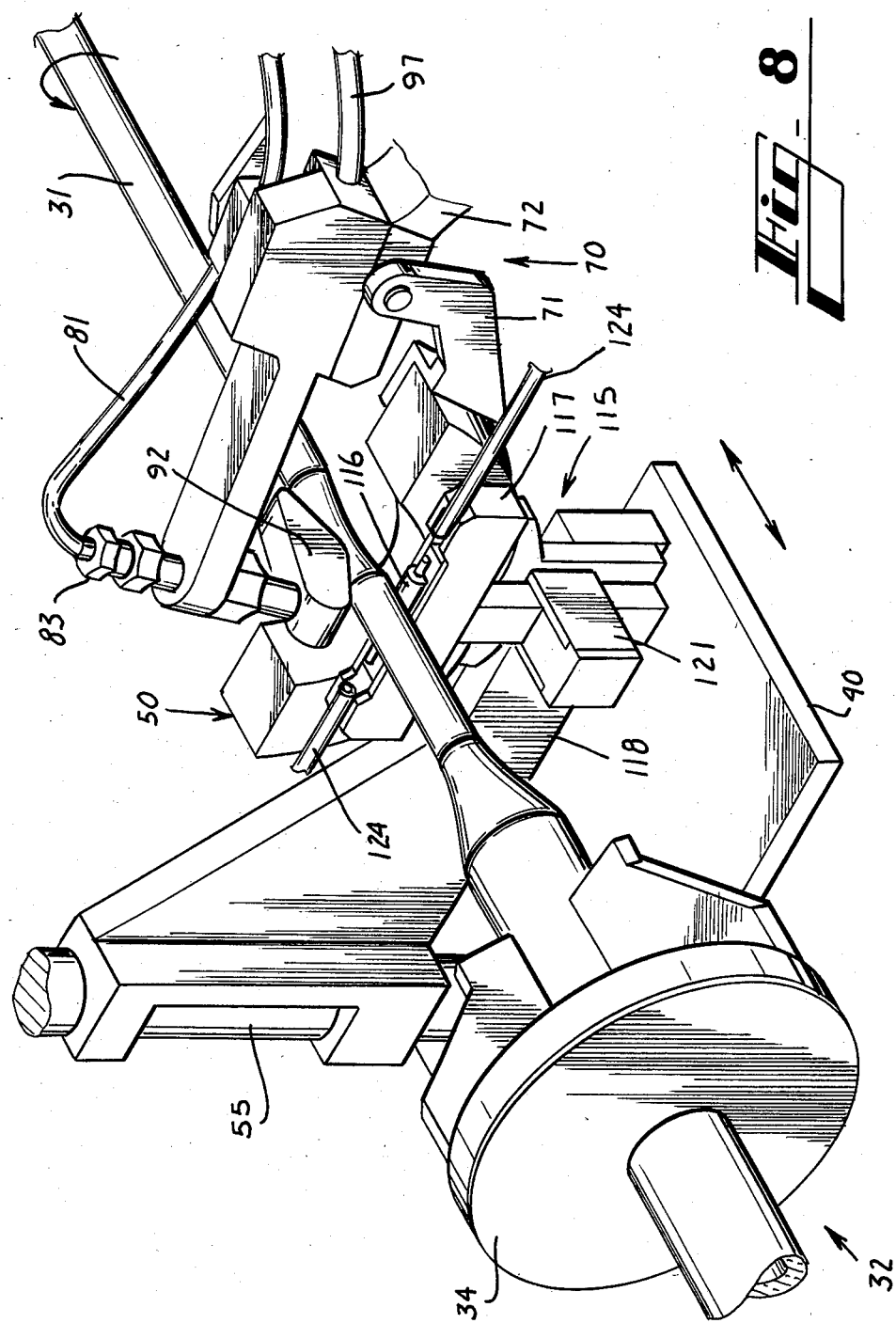
Fig_8

METHODS OF AND APPARATUS FOR AT LEAST PARTIALLY CLOSING AN END PORTION OF AN OPTICAL PREFORM TUBE

TECHNICAL FIELD

This invention relates to methods of and apparatus for at least partially closing an end portion of an optical preform tube from which lightguide fiber is drawn. More particularly, it relates to methods of and apparatus for closing an end portion of a preform tube prior to the tube being collapsed and used to draw lightguide fiber.

BACKGROUND OF THE INVENTION

There are several different techniques for producing a lightguide fiber for use in communications. One such technique comprises directing a constantly moving stream of reactants and oxygen through a glass substrate tube having a generally circular cross-section. The oxygen stream also will carry dopants to produce the appropriate or desired index of refraction in the finished lightguide fiber. The substrate glass is heated to a reaction temperature within a moving hot zone that traverses the outside of the tube, and the consequent reaction products and dopants are fused into a continuous layer on the inner wall of the tube. The resulting tube is referred to as a preform tube.

A torch assembly for heating a glass substrate tube to facilitate deposition is described in U.S. Pat. No. 4,231,777 which issued on Nov. 4, 1980, in the names of B. Lynch and F. P. Partus. A plurality of nozzles which are disposed radially of a rotatably supported glass substrate tube open to an arcuate surface of a housing that is mounted on a carriage and that is spaced a predetermined distance from the tube to be heated. Initially, one end of the tube is supported in the headstock of a lathe and the other end is welded to an exhaust tube that is supported in the tailstock. Combustible gases are directed through the nozzles and toward the tube as it is turned rotatably about its longitudinal axis and as the torch assembly is moved therealong to produce the hot zone. A temperature profile is produced across the hot zone which moves along on the surface of the tube, and, hence inside the tube, with a peak value sufficient to accomplish the desired reaction and deposition. The maximum temperature of the moving hot zone generally is within the confines of the torch assembly, although the temperature profile of the moving hot zone is not symmetrical with respect to the torch assembly.

During a deposition mode, the torch carriage moves slowly from the headstock of the lathe where dopants are moved into the glass tube to the tailstock where gases are exhausted. At the end of each pass from headstock to tailstock, the carriage is returned rapidly to the headstock for the beginning of another pass.

Subsequent to the deposition mode, the preform tube is collapsed into a rod-like member which is called a preform. It is this preform from which lightguide fiber is drawn. In the collapse mode, the torch is moved slowly from the tailstock to the headstock in the lathe and returned rapidly to the tailstock at the end of each pass.

As is known, one end portion of the doped preform tube is closed generally prior to the preform tube being collapsed. This is necessary in multimode fiber production, for example, in order to be able to pressurize the inside of the tube during the collapse mode in order to insure a circular cross-section. Obviously without the end of the tube being closed, the tube cannot be pressurized. For single mode fiber manufacture, a gas is passed through the tube during the first three or four passes of the collapse mode to reduce the moisture level, but even there it is necessary subsequently to close an end portion of the tube.

The closing of the tube is presently accomplished by allowing the torch assembly to dwell at the desired location until the end portion of the preform tube is caused to shrink and become closed. This process consumes in excess of ten minutes and at times results in the closed-off portion of the tube being oval in cross-section and offset from the centerline of the lathe between the headstock and the tailstock. Moreover, that cross-section, which is undesirable for drawing, seemingly is propagated along the length of the tube. It has been found that with the present method of closing, the preform cross-section in some instances is oval for about one-third of the length from the closed area to the headstock end of the tube.

Also, it has been found that bubble entrapment, which may occur adjacent to the end of the preform tube during closing, continues to exist after closing and perhaps even be propagated along the length of the tube. The portion of the tube in which the bubble is located is not collapsed, thereby decreasing the length of useable preform.

In U.S. Pat No. 4,486,214, there is disclosed a technique for collapsing a preform tube. As the preform tube is rotated, forces are applied with a roller to successive increments of length during exposure to and in a fixed relation to the zone of heat in each of a plurality of passes over a period of time. The distance at which the roller is moved toward the central longitudinal axis of the tube is increased at the beginning of each successive pass. The roller, which is cooled by causing contact between its external surface and a cooling medium, is not adaptable to be used to close the end portion of the tube adjacent to the tailstock. Inasmuch as the roller is located to one side of the torch assembly, the point at which the tube may be closed by the roller is outside the confines of the torch assembly where it is too cool to cause the tube to be closed in a relatively short period of time.

Clearly, there is a need for methods and apparatus for providing a closed portion of the preform tube prior to collapse without consuming too much time. This need has not been satisfied by the prior art technique of using a torch which requires undue time, and which may result in an unuseable cross-section of the preform tube along a substantial portion of its length.

SUMMARY OF THE INVENTION

The foregoing problems have been overcome by the methods and apparatus of this invention. A method is provided for causing at least a portion of a glass article to have a predetermined configuration. The method includes the steps of supporting the article for rotation and turning rotatably the article. As the article is being turned rotatably, a portion of the article is subjected to a zone of heat having a predetermined maximum temperature. The portion of the article is controllably engaged with a contact device as the portion of the article is being subjected to the maximum temperature of the zone of heat. A cooling medium is provided to a location within the contact device. In a preferred embodiment, a method is provided for at least partially closing an end portion of a preform tube prior to collapsing the tube into a preform from which optical fiber is drawn. The method includes the steps of supporting the preform tube at its ends for rotation about a longitudinal axis of the tube, and turning rotatably the tube about the longitudinal axis, while subjecting an end portion of the tube, as it is being turned rotatably, to a zone of heat having a predetermined maximum temperature. The end portion of the tube is controllably engaged within the maximum temperature portion of the zone of heat with a contact device to cause the end portion of the preform tube to become at least partially closed, while a cooling medium is provided to a location within the contact device.

Pinch-off of one end of a doped substrate tube from which optical fiber is drawn is accomplished with a hand-held tool. The tool includes a profiled graphite contact portion which is cooled internally. The tool is adapted to be mounted pivotally between side portions of a torch, which is used during deposition and collapse modes of preform manufacturing in the modified chemical vapor deposition (MCVD) process. This arrangement insures contact with an end portion of the preform tube within the maximum temperature portion of the zone of heat. An operator holds the tool to cause the graphite contact portion to engage in a controlled manner the tube as it is being turned rotatably in a lathe and thereby cause the end portion of the tube to be closed at least partially.

BRIEF DESCRIPTION OF THE DRAWINGS

Other features of the present invention will be more readily understood from the following detailed description of specific embodiments thereof when read in conjunction with the accompanying drawings, in which:

FIG. 6 is an enlarged view of an end portion of the glass tube after deposition of materials therein and prior to closing;

FIG. 7 is an enlarged elevational view of the end portion of a tube which has been closed by prior art methods; and FIG. 8 is a perspective view of the apparatus of FIG. 1 with the addition of a tube straightening device.

DETAILED DESCRIPTION

Figure 1:
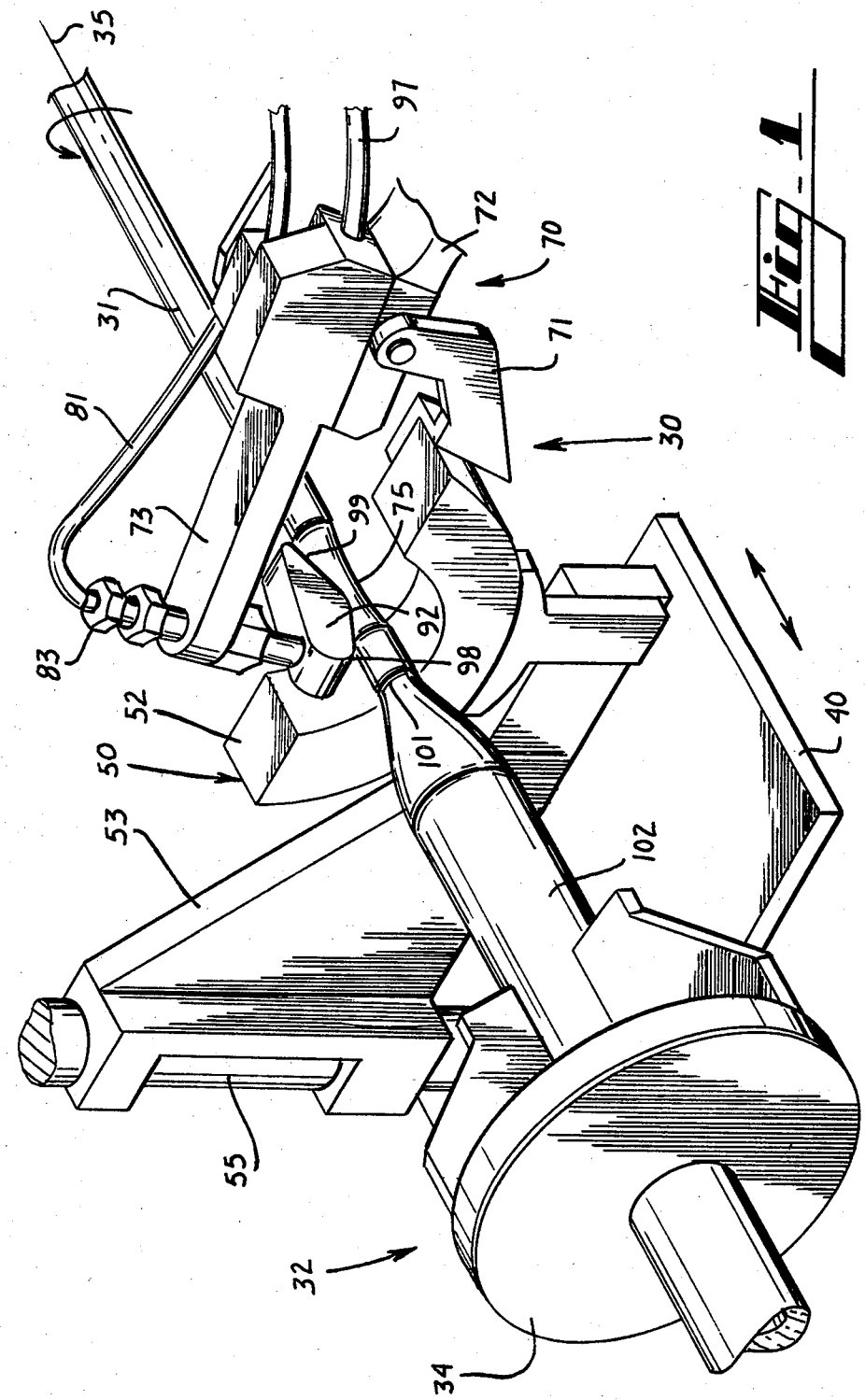
FIG. 1 is a perspective view of an apparatus which includes a tool of this invention for closing at least partially, a portion of a doped glass substrate tube.

Referring now to FIG. 1 there is shown an apparatus, designated generally by the numeral 30, for heating a glass substrate tube 31 to manufacture a glass preform from which is drawn lightguide fiber. The heating of the tube 31 is required in order to cause the reaction products of gases and/or dopants being fed into the tube to be fused to the inside wall of the tube to provide an optically suitable profile for communications use. The heating of the glass tube 31 is carried out while gas phase reactants are delivered to the tube. A system for this delivery is disclosed in U.S. Pat. No. 4,276,243 which issued on June 30, 1981 in the name of F. P. Partus and which is incorporated by reference hereinto.

The apparatus 30 generally comprises a lathe 32 having a headstock (not shown) and a tailstock chuck 34 which are driven off a common shaft (not shown) and which are used to support the glass starting tube 31 for rotation about a longitudinal axis 35. The lathe 32 also includes a carriage 40 which is mounted for reciprocal movement along the lathe. Mounted on the carriage 40 is a torch assembly which is designated generally by the numeral 50. The torch assembly 50 is adapted to cause a flow of combustible gases to produce flames which are directed toward the tube 31.

The torch assembly 50 may be constructed to be a surface mix unit. In a surface mix unit, each of the two combustible gases is fed through the torch assembly 50 and are mixed together within a confinement provided between the torch assembly and the tube. A description of the surface mix torch assembly is provided in the aforementioned U.S. Pat. No. 4,231,777 which is incorporated by reference hereinto. The torch assembly 50 includes a housing 52 mounted on a bracket 53 which is supported from a post 55 that is mounted on the carriage 40.

The mounting of the torch assembly 50 for movement relative to a centerline of the lathe 32 which extends between the headstock and the tailstock 34 provides for variable confinement of the substrate tube 31. The variable confinement of the tube 31 is of help in the control of the temperature profile along successive portions of the tube 31 as the torch assembly is moved reciprocally along the length of the rotating tube during a deposition mode.

By confining the heat from the burning gases to a desired surface area of the tube, the torch assembly 50 establishes a zone of heat 56 (see FIG. 2) having a temperature profile at the surface of the tube with temperatures in the range of about 1800° C. The zone of heat 56 which is normally called a hot zone is a length of the tube 31 along which a temperature profile is formed by the torch assembly as it passes over the tube. The zone of heat 56 extends ahead of the torch assembly 50 and behind it. The mounting of the torch assembly 50 on the carriage 40 and its movement relative to the tube 31 causes the zone of heat to be moved along the length of the tube. Because the torch assembly 50 moves along the tube 31, the zone of heat shifts and a maximum temperature 58 within the zone of heat trails a centerline 62 of the torch assembly 50. Accordingly, the zone of heat is said to trail the torch assembly 50.

Figure 3:
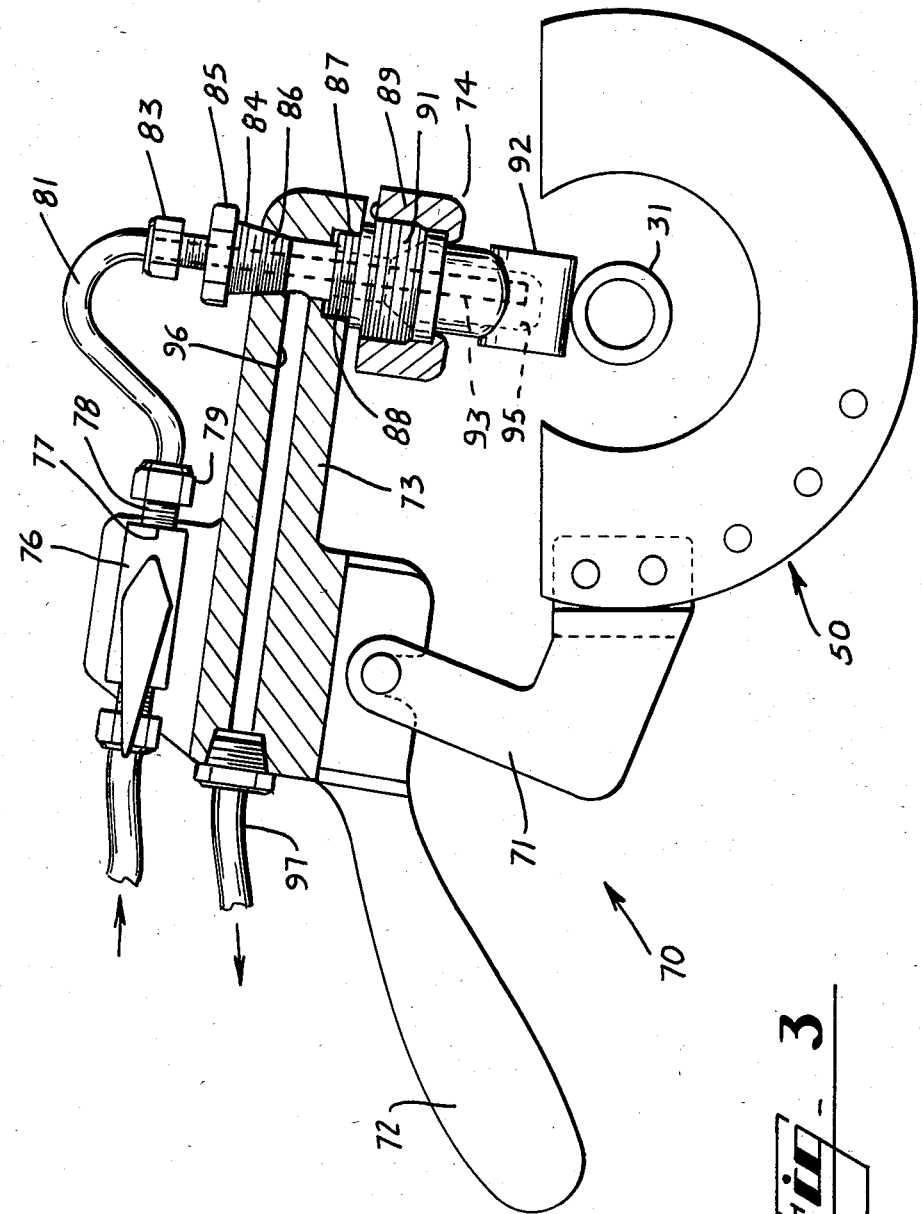
FIG. 3 is an elevational view of the tool of FIG. 1.

Referring now to FIG. 3, there is shown a tool which is designated generally by the numeral 70 for closing, in a preferred embodiment, an end portion 75 of (see FIG. 1) the preform tube. It should be understood that this invention may be used to close at least partially any portion of the tube and that the term end portion is interpreted to mean a portion which includes the tube end or a portion adjacent thereto. The tool 70 is mounted pivotally on a bracket 71 which is attached to the torch assembly 50. The tool 70 includes a handle 72 which may be grasped by an operator for moving a contact portion of the tool into and out of engagement with the preform tube. Extending inwardly from the handle 72 toward the preform tube is a body portion 73 of the tool which has a depending portion 74. The body portion 73 includes an on-off valve 76 through which is formed a passageway 77 which is connected through a threaded fitting 78 and nut 79 to a formed tube 81. The formed tube 81 extends through a nut 83 which is turned onto a threaded portion of a fitting 84 having a ferrule 85 at an upper end thereof. As the nut 83 is turned onto the threaded portion of the fitting 84, it extrudes the ferrule onto the tube 81 to provide a leak-proof connection. The fitting 84 has a threaded portion 86 extending therefrom which is turned threadably into the body portion 73 of the tool. Also, the body portion 73 of the tool 70 has a threaded opening 87 for receiving a threaded member 88.

The threaded member 88 includes a collar 89 which is designed to hold an insert 91 having a contact device 92 attached to a lower end thereof. It is the contact device 92 which is used to engage and to close at least partially the end portion 75 of the preform tube at the tailstock end prior to or subsequent to beginning the collapse mode.

In a preferred embodiment, the contact device 92 is made of graphite. However, it should be realized that the contact device 92 could be made of metal as well as of graphite. The graphite is preferred for use with optical glass because if any flakes off, it volatizes and degrading residues are avoided. With metal, products of degradation may become deposited in the preform which is detrimental to the strength performance of the drawn fiber.

The above-described arrangement facilitates the internal cooling of the contact device 92. In order to cool internally the contact device 92, a cooling medium such as room temperature water is moved into the valve 76 of the tool 70 through the formed tube 81 and through the fitting 84 into the body portion 73 of the tool. The water flows downwardly through a passageway 93 toward the contact device 92 and into a cavity 95 of the contact device and insert 91. From there, the water flows upwardly through the insert 91 and through a passageway 96 to a flexible tube 97 for recirculation.

The internal cooling of the contact device 92 is unlike prior art glass forming tools, which may be cooled externally, and is advantageous from several standpoints. Because of this arrangement, water spills associated with prior art devices are avoided and the tool 70 is rendered portable and capable of being moved about a workpiece. Also, it prevents premature erosion of the graphite in the preferred embodiment. Although the externally cooled graphite shown in aforementioned U.S. Pat. No. 4,486,214 prevents the contact device from adhering to the glass tube, only the internally cooled contact device enjoys the other aforementioned advantages as well.

It should be observed from the drawings that the contact device 92 has a particular configuration so that it appropriately may cause the closedoff portion of the preform tube to have a predetermined configuration. As can be seen in FIG. 1, the contact device 92 is formed with an arcuate portion 98 and an arcuate portion 99. The arcuate portion 99, which is oriented toward the headstock end of the lathe 32, is sloped more gently than that of the portion 98.

During the manufacture of the preform with the apparatus 30, a glass tube 31 is positioned in the lathe with one of its ends in the headstock and with its other end connected by a welded joint 101 (see FIG. 1) to an exhaust tube 102. The exhaust tube 102 is supported in the tailstock chuck 34 of the lathe 32. The tube 31 is rotated as the torch assembly 50 is moved in a plurality of passes in a direction from the headstock to the tailstock chuck 34. During each pass, doped reactants are moved into the tube from its headstock end while spent gases are exhausted at the tailstock end. For a description of methods and apparatus for exhausting these gases, see U.S. Pat. No. 4,278,459 which issued on July 14, 1981 in the name of F. P. Partus and which is incorporated by reference hereinto.

Following deposition in a preferred embodiment, the torch assembly 50 engages a limit switch (not shown) near the tailstock end of the lathe. This causes the travel of the carriage 40 to be discontinued to allow the wall of the tube to become pinched together adjacent to its tailstock end. This prevents the entry of moisture and other contaminants into the tube 31 while it is being collapsed. Also, it is helpful in maintaining the positive pressure inside the tube 31 to prevent the formation of any irregularities in the tube as the tube is being collapsed.

The closing of the end portion 75 of the tube 31 is accomplished by moving the contact device 92 into engagement with the preform tube (see FIG. 4) and applying forces to move it gradually toward the longitudinal axis 35 of the tube. Or, the contact device 92 could be moved repeatedly inwardly toward and then out of engagement with the tube with each successive move inwardly being closer to the longitudinal axis of the tube. This latter procedure allows the glass tube 31 to be reheated while the contact device 92 is out of engagement with the tube. As a result, the contact device 92 is more effective in its next contact cycle with the tube. Otherwise, the contact device 92 after a time may cool the tube and hamper further reduction of the tube cross-section. The use of the tool 70 causes the end portion 75 of the tube 31 to have the configuration shown in FIG. 5. Afterwards, the tool 70 is removed from the bracket 71 and the torch assembly 50 is ready to be moved to the right as viewed in FIG. 1 in a plurality of passes to cause the preform tube having the closed-off end portion 75 (see FIG. 5) to be collapsed.

Figure 4:
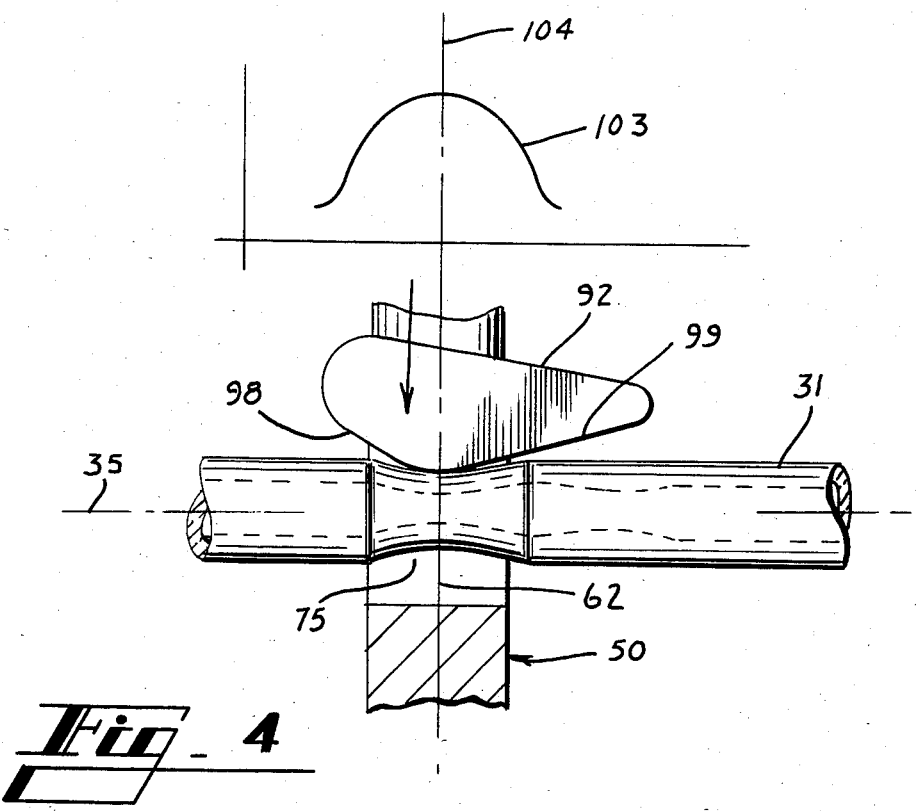
FIG. 4 is a detail view of a portion of the tool of FIG. 3 in initial engagement with the doped substrate tube.
Figure 5:
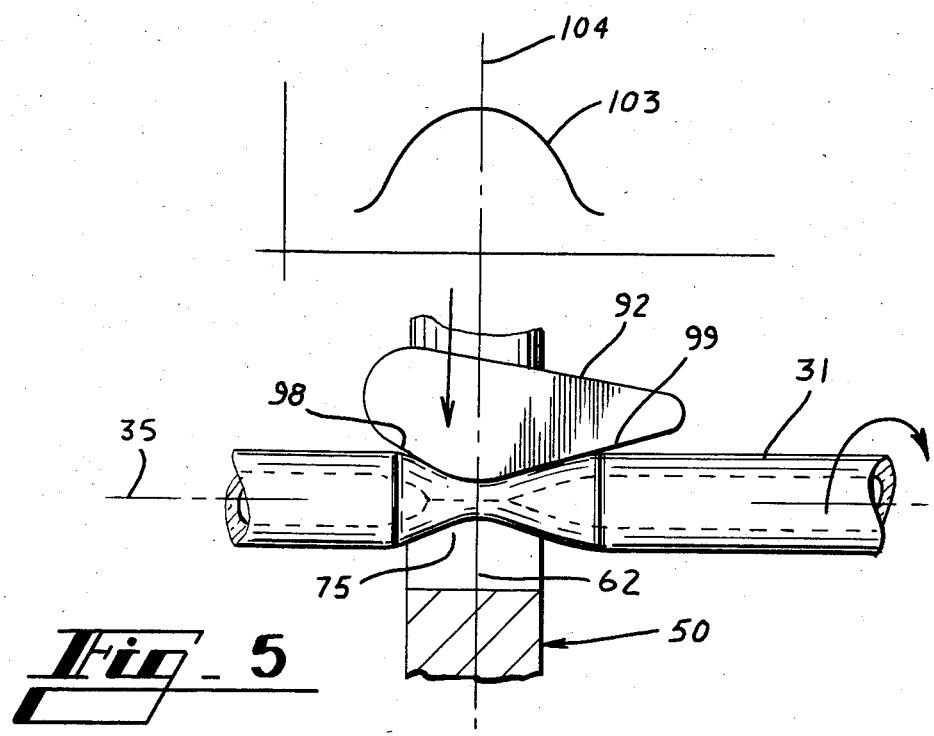
FIG. 5 is a detail view of the tube of FIG. 4 after an end portion thereof has been closed with the tool of FIG. 3.

The disposition of the tool 70 with respect to the torch assembly 50 is beneficial. Shown in FIGS. 4 and 5 is a zone of heat 103 which is provided by the torch assembly 50 when the torch assembly is stationary during pinchoff. As can be seen from the drawings, the zone of heat 103 is symmetrical about a predetermined maximum temperature 104 which coincides generally with the centerline 62 of the torch assembly. The maximum temperature of the heat zone is about 1800° C. Inasmuch as the tool 70 is mounted pivotally along the centerline 62 of the torch assembly 50 between the side plates thereof, the contact device 92 is adapted to engage the tube 31 at and on either side of the maximum temperature 104 of the stationary zone of heat 103. This enables the tool 70 to be extremely effective in closing at least partially the end portion 75 of the tube 31 and facilitates a controlled reduction in cross-section.

Several desirable results flow from the arcuate configuration of the contact device 92. First, the contact device 92 is able to control the shape of the tube in the area of the closing, and secondly, the reduced diameter portion is controlled so that it is possible if desired to leave a passageway therethrough. In a preferred embodiment, the controlled engagement of the contact device 92 with the tube 31 at the end portion 75 causes the cross-section of the closed-off portion of the tube to be substantially circular. It has been found that if the cross-section of the closed-off portion is substantially circular, the remainder of the tube will have circularity. As a result, the tubes 31—31 which are closed in accordance with this invention have been found to have cross-sections which are substantially circular throughout their lengths.

The use of the contact device 92 of this invention also is helpful in increasing the useable length of preform tube. As will be recalled, bubble entrapment occurs adjacent to the closed-off region 75. The wall of a portion 111 of the tube 31 adjacent to the end portion 75 has been formed to be somewhat more thick than the remainder of the tube (see FIG. 6). This may come about because of the increased velocity of the dopant gases adjacent to the tailstock end of the tube 31. When a torch assembly has been used for closing an end portion of the tube, the glass at the thicker wall section contracts more quickly than that between it and the tailstock which causes the formation of a bubble 112 (see FIG. 7).

The useable length of preform tube is reduced if a bubble occurs. Further, the reduction in useable length depends on the size of the bubble. It has been the practice to move the torch assembly 50 back and forth from the desired closing location to the thicker wall area to try to reduce the size of the entrapped bubble. However, this procedure requires additional time. Advantageously, the profiled graphite contact device 92 of this invention approximates the effect of moving the torch back and forth during closing with much less time required. Closing in accordance with this invention consumes no more than about three minutes. Further, it appears that the contact device 92 is more effective in eliminating the formation of the bubble in the first instance. As a result, the tube 31 has a substantially cylindrical passageway during collapse and the useable length of the preform tube is increased over that achieved with prior art methods.

After its end portion has been at least partially closed, the preform tube 31 is in condition to be collapsed. Prior to collapse, the tube may be straightened. Accordingly, the apparatus 30 also may include facilities for causing the glass substrate tube 31 of the preform tube produced therefrom to have a central longitudinal axis which is a straight line and to have a predetermined configuration along its length. Any sag or offset developed during the deposition mode and any inherent tube ovality may be aggravated during collapse when the torch carriage is moved and the tube is rotated more slowly, and when the temperatures of the preform tube are higher than during deposition. Non-straight preforms may not meet manufacturing specifications and be rejected, or they may limit the amount of fiber which can be drawn therefrom. Tube straightening facilities are disclosed in detail in U.S. Pat. No. 4,477,273 which issued on Oct. 16, 1984 in the names of B. Lynch and F. P. Partus and which is incorporated by reference hereinto.

Going now to FIG. 8, a tube straightening device 115 may be positioned adjacent to what is the trailing side of torch assembly 50 during the collapse mode. In a preferred embodiment, the straightening device 115 includes a roller 116 which is made of graphite. The roller 116 is supported in a housing 117. The straightening device may take other forms such as for example, a metallic tube.

As can also be seen in FIG. 8, the straightening device 115 is mounted on an arm 118 of the torch bracket 53, but could just as well be supported from the torch assembly 50 or directly supported from carriage 40.

Figure 2:
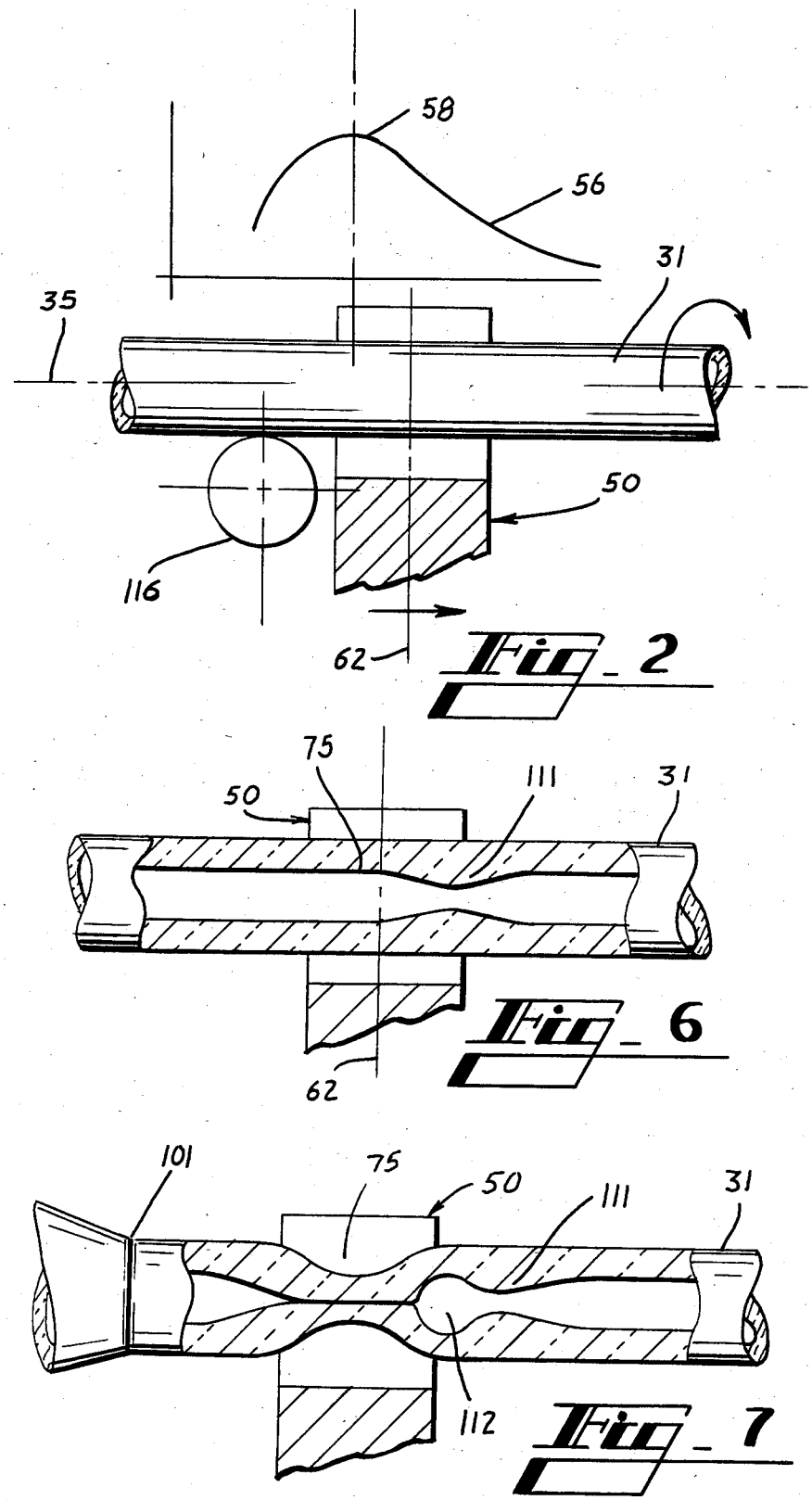
FIG. 2 is an enlarged view of a portion of a torch assembly and a temperature profile across a zone of heat which traverses the tube as the torch assembly is moved along the tube.

Further, in an operated position in the preferred embodiment, it is positioned initially below the glass tube 31 which is destined to become the preform (see also FIG. 2).

The straightening device 115 is mounted for movement vertically. The vertical movement may be provided by a rack and pinion arrangement 121 as shown in FIG. 8, a screw and bushing arrangement (not shown), or other equivalent mechanism.

In a preferred embodiment, the straightening device 115 includes facilities for causing the surface that engages the tube 31 to have a temperature that is substantially below that of the preform. The housing 117 is adapted to hold a coolant such as deionized water which may be supplied by tubes 124—124. The water is applied over the external surface of the roller 116 to clean the surface of the roller, which engages the tube 31. The water drains from the housing through a passageway (not shown) in the rack and pinion arrangement 121.

Prior to or during the first pass of the collapse mode, the graphite support roller 116 is moved upwardly to contact the rotating glass tube 31. This may be done manually or automatically. The roller 116 is pushed into the softened glass within the moving zone of heat a predetermined distance behind the centerline 62 of the torch assembly 50. Accordingly, the roller 116 is adapted to urge each successive increment of length of the tube 31 upwardly until it is disposed substantially concentrically about the centerline between the chucks of the lathe 32.

The contact device 92 of this invention also realigns any offset or dog leg which is formed in a preform tube at its end with the lathe spindle centerline to prepare the tube for straightening. But for this, the straightening device may be ineffective when engaged with an offset or dog leg.

After the straightening pass, the operator lowers the support roller 116 and causes the carriage 40 to return to the tailstock. Should the tube 31 not be straightened after the pass, the operator may raise the roller 116 on subsequent passes in the same manner as that during the initial pass. Seconds after the carriage 40 begins its next pass, the roller 116 is moved upwardly until it just contacts the tube 31.

Then the doped glass tube 31 is collapsed into a solid preform preparatory to drawing. During the collapse mode, the heating, at a higher temperature than during deposition, occurs as the torch assembly 50 is moved in a number of passes from the tailstock to the headstock of the lathe 32. At the end of each pass during the collapse mode, the carriage is returned rapidly to the tailstock for the beginning of another cycle.

It should be understood that the above-described arrangements are simply illustrative of the invention. Other arrangements may be devised by those skilled in the art which will embody the principles of the invention and fall within the scope and spirit thereof.

What is claimed is:

1. A method of at least partially closing a portion of a preform tube prior to collapsing the tube into a preform from which optical fiber is drawn, the method including the steps of:

supporting the preform tube for rotation about a longitudinal axis of the tube;
turning rotatably the tube about the longitudinal axis; while subjecting a portion of the tube, as it is being turned rotatably, to a static zone of heat which is generally symmetrical about a predetermined maximum temperature thereof; and controllably engaging in a reproducible manner the portion of the tube with a contact device at the maximum temperature portion of the static zone of heat to cause the portion of the preform tube to become at least partially closed; while providing a cooling medium to a location within the contact device.

2. The method of claim 1, wherein the zone of heat is provided by a torch which subsequently is moved along the tube from one end of the tube to an opposite end on a carriage to collapse the tube and wherein the contact device is adapted to engage the tube between side portions of the torch with a portion of the contact device which is the first portion to engage the tube being aligned with the centerline of the torch.

3. The method of claim 2, wherein the contact device is configured to have a portion between the centerline of the torch and the opposite end of the tube which is relatively gradually converging toward that portion which first engages the tube to cause interior and exterior walls of the tube to have a converging portion of a predetermined configuration.

4. The method of claim 1, wherein the step of engaging the tube with an internally cooled contact device causes the portion of the tube which is at least partially closed to have a circular cross-section.

5. An apparatus for at least partially closing a portion of a preform tube prior to collapsing the tube into a preform from which optical fiber is drawn, said apparatus including:

means for supporting the preform tube for rotation about a longitudinal axis of the tube;

means for turning rotatably the tube about the longitudinal axis;

torch means being disposed in a fixed position for subjecting a portion of the tube to a zone of heat which is generally symmetrical about a predetermined maximum temperature as the tube is turned rotatably, the maximum temperature of the zone of heat being aligned with the centerline of said torch means; and tool means including an internally cooled contact device for controllably engaging the portion of the tube as the portion is being subjected to the maximum temperature of the zone of heat to cause the portion of the preform tube to become at least partially closed.

6. The apparatus of claim 5, wherein the tube is supported for rotation between a headstock and a tailstock of a lathe, and wherein said apparatus includes means rendered effective subsequent to the at least partial closing of a portion of the tube for moving said torch means from the headstock to the tailstock in a plurality of operative passes during the deposition of reactants and dopants into the tube, and for moving said torch means from the tailstock to the headstock in a plurality of operative passes during collapse of the tube subsequent to deposition.

7. The apparatus of claim 6, wherein said tool means is mounted pivotably releasably on said torch means and is capable of being removed from said torch means after the portion of the tube has been at least partially closed.

8. The apparatus of claim 6, wherein said tool means is mounted pivotally on said torch means with said contact device adapted to engage the tube between side portions of said torch means.

9. The apparatus of claim 6, wherein said tool means includes a conduit within a body portion of said tool means, said conduit being adapted to direct a cooling medium to the vicinity of said contact device.

10. The apparatus of claim 9, wherein said conduit is provided to recirculate the cooling medium from the vicinity of said contact device to a supply.

11. The apparatus of claim 6, wherein said contact device has a configuration which is suitable for causing the closed portion of the preform tube to have a predetermined configuration.

12. The apparatus of claim 11, wherein said predetermined configuration is arcuately shaped to provide portions converging toward the end portions of the tube, and wherein the converging portion which is oriented toward the headstock is more gradual than the other.

* * * * *